US 9,710,288 B2

United States Patent
Lu

(10) Patent No.: US 9,710,288 B2
(45) Date of Patent: Jul. 18, 2017

(54) METHOD AND DEVICE FOR LOADING APPLICATION PROGRAM

(75) Inventor: Gang Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 261 days.

(21) Appl. No.: 13/977,044

(22) PCT Filed: Jul. 20, 2011

(86) PCT No.: PCT/CN2011/077362
§ 371 (c)(1),
(2), (4) Date: Jun. 28, 2013

(87) PCT Pub. No.: WO2012/142798
PCT Pub. Date: Oct. 26, 2012

(65) Prior Publication Data
US 2014/0033208 A1 Jan. 30, 2014

(30) Foreign Application Priority Data
Apr. 20, 2011 (CN) .......................... 2011 1 0099297

(51) Int. Cl.
G06F 9/46 (2006.01)
G06F 9/445 (2006.01)
(52) U.S. Cl.
CPC .................................. *G06F 9/445* (2013.01)
(58) Field of Classification Search
None
See application file for complete search history.

(56) References Cited

U.S. PATENT DOCUMENTS

| 7,343,603 | B1* | 3/2008 | Fresko ........................... 719/310 |
| 7,426,720 | B1* | 9/2008 | Fresko ........................... 717/140 |
| 2005/0081220 | A1* | 4/2005 | Yodaiken et al. ............ 719/331 |

(Continued)

FOREIGN PATENT DOCUMENTS

| CN | 101055529 A | 10/2007 |
| CN | 101719960 A | 6/2010 |
| CN | 101902756 A | 12/2010 |

OTHER PUBLICATIONS

Kiyokuni Kawachiya, "Cloneable JVM: A New Approach to Start Isolated Java Applications Faster", Jun. 13-15, 2007. ACM 978-1-59593-630—Jan. 7, 0006.*

(Continued)

*Primary Examiner* — Lewis A Bullock, Jr.
*Assistant Examiner* — Wynuel Aquino
(74) *Attorney, Agent, or Firm* — Cantor Colburn LLP

(57) ABSTRACT

Disclosed in the present disclosure is an application loading method, including: an M2M terminal module starts up an application manager after being powered up and initialized; the application manager receives a load application instruction and creates a load thread; and the load thread loads an application according to a load application instruction and ends the load thread after the execution of the application is completed. Also disclosed in the present disclosure is an application loading device. By way of the method and device in the present disclosure, the compile efficiency is improved, and it is advantageous for terminal maintenance, and the service function is realized when executing an independent application.

19 Claims, 2 Drawing Sheets

(56) References Cited

U.S. PATENT DOCUMENTS

2007/0165579 A1    7/2007  Delibie et al.
2009/0183142 A1*   7/2009  Hoban ................ G06F 11/3664
                                                    717/125

OTHER PUBLICATIONS

Int'l Search Report issued Feb. 2, 2012 in Int'l Application No. PCT/CN2011/077362.

* cited by examiner

METHOD AND DEVICE FOR LOADING APPLICATION PROGRAM

CROSS-REFERENCE TO RELATED APPLICATION

This application is a Section 371 of International Application No. PCT/JP2011/077362, filed Jul. 20, 2011, which was published in the Japanese language on Oct. 26, 2012, under International Publication No. WO 2012/142798 A1, and the disclosure of which is incorporated herein by reference.

TECHNICAL FIELD

The present disclosure relates to the field of machine to machine (M2M), and in particular to a method and a device for loading an application program in an M2M terminal module.

BACKGROUND

The Internet of things is a network formed for covering all the things in the world by converging technologies such as wireless data communication and the like on the basis of computer Internet, for achieving interconnection and sharing information among articles. M2M is a technique and means for establishing connections among machines, and with the development of mobile communication technologies, M2M relevant services and products are growing dramatically and have penetrated into various aspects of the national economy, including application in industries such as environment monitoring, intelligent household, intelligent power grid, automatic metering and so on, and urge for a new round of reform of social production and life styles.

At the current stage, the M2M terminal mainly accesses the networks of the mobile operators by way of wireless communication to achieve communication with the industry application management service platform. The development manner of the mainstream M2M terminals is to carry out secondary development using the secondary development interface provided by the platform software on the basis of the available software and hardware functions of the wireless communication module. Since most of the current development patterns of the M2M terminal platform are to compile the application code and platform code together. The application code, also referred to as industry application code, is closely coupled with the platform code via the secondary development interface, and the compiled platform code and application code are integrated together to finally generate an integral executable mirror file. This causes low compile efficiency when developing industry application software and that the platform and industry application cannot realize independent upgrade and it is disadvantageous for the performance maintenance of the terminal.

The new development trend to separate the application from the platform software of the M2M terminal as independent program and platform software to be developed and compiled separately. However, since the platform itself does not have the environment to support the running of independent applications, the urgent affair is to develop an independent application dynamic loading and running technology.

SUMMARY

In view of this, the main object of the present disclosure is to provide a method and a device for loading an application program, which not only improves compile efficiency and is advantageous for terminal maintenance but also can realize service functions when executing an independent application.

In order to solve the above technical problems, the technical solution of the present disclosure is achieved as such:

The present disclosure provides a method for loading an application program, comprising: a machine to machine (M2M) terminal module starting up an application manager after being powered up and initialized; the application manager receiving a load application instruction and creates a load thread; and the load thread loading an application according to a load application instruction and ending the load thread after the execution of the application is completed.

In the above solution, the load thread loading an application according to a load application instruction comprises: the load thread opening an application mirror file in a file system according to an application mirror file path contained in the load application instruction, reading the application mirror file length, preloading the application mirror file, acquiring application mirror file information, and loading the application.

In the above solution, preloading the application mirror file comprises: the load thread allocating a space with the corresponding length in the memory according to a preset replacement function code length, reading the code of the replacement function in the most beginning part of the application mirror file, and copying the code into the allocated space for execution, the load tread sending an acquisition application mirror file information parameter to the replacement function, and the replacement function acquiring the application mirror file information according to the received parameter.

In the above solution, loading an application comprises: acquiring the space size required to execute the application mirror file according to the application mirror file information and application mirror file length, releasing the space allocated by the preloading, allocating a space with corresponding size in the memory and initializing according to the space size required to execute the application mirror file, copying the application mirror file into the allocated space, executing the replacement function, sending an invoke application ingress function parameter to the replacement function, the replacement function invoking the application ingress function.

In the above solution, after loading the application, the method further comprises: when executing the application, executing a soft interruption instruction, triggering a soft interruption exception, entering a soft interruption server program, wherein the soft interruption server program executes a secondary development interface function corresponding to a soft interruption instruction according to the soft interruption instruction and the correlation between the locally stored soft interruption instruction and the secondary development interface function and returning to continue executing the application after the execution of the secondary development interface function is completed.

In the above solution, after starting up the application manager, the method further comprises: the application manager receiving an update application instruction, creating an update thread, wherein the update thread acquiring an updated application mirror file according to the updated application mirror file address in the received update application instruction and overwriting the application mirror file in a file system.

The present disclosure also provides a device for loading an application program, comprising: an application manager and a load thread. The application manager is configured to receive a load application instruction after an M2M terminal module is powered up, initialized and started up, creates a load thread, and ends the load thread after the execution of an application is completed. The load thread is configured to load and execute the application according to the load application instruction.

In the above solution, the load thread is configured to open an application mirror file in a file system according to a path of the application mirror file contained in the load application instruction, read the length of the application mirror file, preload the application mirror file, acquire information of the application mirror file, and load the application.

In the above solution, the load thread is configured to allocate a space with the corresponding length in the memory according to a preset replacement function code length, read the code of the replacement function in the most beginning part of the application mirror file, copy the code into the allocated space for execution, and receive the application mirror file information returned by the replacement function.

In the above solution, the load thread is configured to acquire the space size required to execute the application mirror file according to the information of the application mirror file and the length of the application mirror file, allocate a space with corresponding size in the memory and copy the application mirror file into the allocated space, and execute the replacement function, and the replacement function invoke the application ingress function to execute the application.

In the above solution, the device further comprises: a soft interruption service program unit configured to execute a secondary development interface function corresponding to a soft interruption instruction according to the soft interruption instruction and the correlation between the soft interruption instruction and the secondary development interface function; and correspondingly, the load thread is further configured to notify the soft interruption service program unit when receiving the soft interruption instruction.

In the above solution, the device further comprises: an update thread configured to acquire the updated application mirror file according to the updated application mirror file address in the update application instruction to overwrite the application mirror file in the file system; and correspondingly, the application manager is further configured to receive the update application instruction and creates an update thread.

It can be seen that by way of the method and device in the present disclosure, after receiving a load application instruction, the application manager creates a load thread, and the load thread loads an application according to the received instruction, as such, an independently compiled application can be loaded, improving compile efficiency; furthermore, an update application instruction can be received to create an update thread which can be independently updated, that is, upgrading the application, which is advantageous for terminal maintenance; and the secondary development interface function can be executed by way of triggering soft interruption, so as to access the secondary development interface, and service functions such as short message, voice and so on can be realized when executing an independent application.

DETAILED DESCRIPTION OF EMBODIMENTS

The basic concept of the present disclosure is: after being powered up and initialized, the M2M terminal module starts up the application manager, and the application manager creates a load thread according to the received instruction and loads an application, and ends the load thread after the execution of the application is completed.

The preferred embodiments are described in conjunction with the drawings as follows. It shall be understood that the preferred embodiments described herein are only used to describe and explain the present disclosure and shall not be construed as improper limitations on the same. The embodiments of the present application and the features of the embodiments can be combined with each other if there is no conflict.

Figure 1:
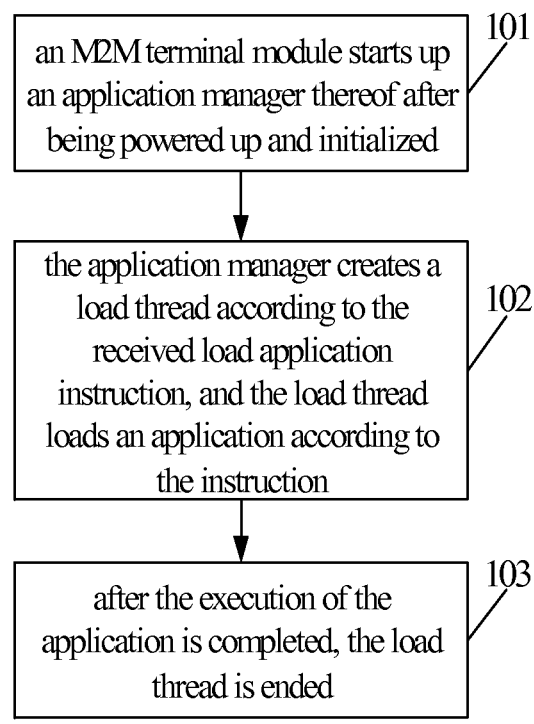
FIG. 1 is a schematic diagram of a method for loading an application program according to one embodiment of the present disclosure.

A method for loading an application is provided according to one aspect of the present disclosure, and as shown in FIG. 1, the method includes the following steps.

Step 101, an M2M terminal module starts up an application manager thereof after being powered up and initialized.

Herein, after the M2M terminal module is powered up, the platform software of the M2M terminal module performs basic functions and service initialization, including: hardware initialization, system resource initialization, protocol stack initialization, etc., and then starts up the application manager.

Step 102, the application manager creates a load thread according to the received load application instruction, and the load thread loads an application according to the instruction.

Herein, the application manager receives the load application instruction, and the path of the application mirror file in the file system is contained in the loaded application instruction, which can be sent by another module of the M2M terminal module or by the user via the USB interface of the M2M terminal module and so on; the application manager creates the load thread and sends the path to the load thread, and the load thread opens the application mirror file in the file system according to the path, reads the length of the application mirror file, preloads the application mirror file, acquires information of the application mirror file, and loads the application.

The application mirror file is a mirror file generated by the application independently compiled by the compiler. The mirror file is in the format of binary file (BIN), with the data and instruction therein being addressed independently, i.e., the addresses of the instruction and data in the compiled application mirror file are relative addresses, so that the application mirror file can be copied into any segment of space in the memory for execution and downloaded into the file system of the M2M terminal module. Reading the length of the application mirror file includes: the load thread invokes a C library function, and the C library function acquires the length of the application mirror file and sends the same to the load thread.

Figure 2:
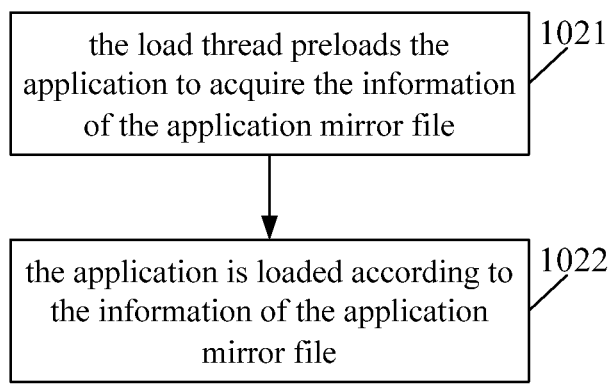
FIG. 2 is a schematic diagram of a method for loading an application program via a load thread according to one embodiment of the present disclosure.

Preloading the application mirror file, acquiring information of the application mirror file, and loading the application as shown in FIG. 2 in the above process include the following steps.

Step 1021, the load thread preloads the application to acquire the information of the application mirror file.

In this case, the preloading process includes: the load thread first allocates a space with the corresponding length in the memory according to a preset replacement function code length, reads the code of the replacement function of the application ingress function in the most beginning part of the application mirror file according to the application mirror file path, and copies the code into the allocated space for execution, sends a parameter for acquiring information of the application mirror file to the replacement function, and the replacement function acquires the information of the application mirror file according to the received parameter, and then returns the acquired information of the application mirror file to the load thread.

The replacement function is a replacement application ingress function located in the most beginning part of the application mirror file and is used for acquiring the application mirror file information when receiving and acquiring the application mirror file information parameter and for invoking the application ingress function when receiving and invoking the application ingress function parameter, wherein the parameter can be set as required. For example, there is a two dimensional array, wherein one dimension represents that various functions to be realized by the replacement function and one dimension represents the return value of the replacement function, and assuming that the array sent to the replacement function is (1, 0), wherein 1 represents that the replacement function is to acquire the application mirror file information, and after the replacement function acquires the application mirror file information, assuming that the acquired file information is 2, then (1, 2) will be returned to the load thread. Assuming that the array sent to the replacement function is (0, 0), 0 represents to invoke the application ingress function, and the replacement function need not return any information to the sending party of the parameter.

The application mirror file information is zero initialization data area length, wherein acquiring the application mirror file information includes: the replacement function queries the application mirror file according to its own zero initialization data area length parameter to acquire the parameter value of the parameter corresponding to that parameter. The zero initialization data area length is a parameter and the corresponding parameter value stored in the form of global variables, which is generated when a compiler compiled application to generate the application mirror file.

Step 1022, the application is loaded according to the application mirror file information.

In particular, the load thread acquires the space size required to execute the application mirror file according to the acquired information of the application mirror file and the length of the application mirror file, wherein the acquisition is to plus the length of the application mirror file with the zero initialization data area length, i.e. the space size required to execute the application mirror file.

The space allocated by preloading is released, a space with corresponding size is allocated in the memory according to the acquired space size required to execute the acquired application mirror file, and at the same time, the allocated space is initialized, wherein the initialization is to clear the space.

The load thread reads the application mirror file and copies the same to the allocated space, then the load thread starts to execute from the head address of the allocated space, that is, executing the replacement function of the application ingress function, at this moment, the load thread sends an invoking application ingress function parameter to the replacement function, and the replacement function invokes the application ingress function according to the received parameter, wherein the application ingress function is used for executing an application.

Step 103, after the execution of the application is completed, the load thread is ended.

Herein, after the execution of the application is completed, the application ingress function returns a state value to the application manager according to the execution state. The load thread unloads the application mirror file and releases the allocated space, and the application manager determines the subsequent execution steps according to the received state value and the correlation stored thereby between the state value and the state. For example, the received state value is 1, the state corresponding to state value 1 is execution error and to end the execution, then the application manager will end the load thread, wherein the correlation between the state value and the state can be set as required.

Furthermore, after step 101, if the application manager receives the update application instruction sent by the network module, it creates an update thread, and the update thread updates the application according to the received instruction, with the update application instruction containing the address of the updated application mirror file, and the particular update process is: the update thread reads the updated application mirror file in the address according to the address of the updated application mirror file in the received update application instruction and overwrites the application mirror file in the file system. As such, the independent upgrade of the application can be completed.

Figure 3:
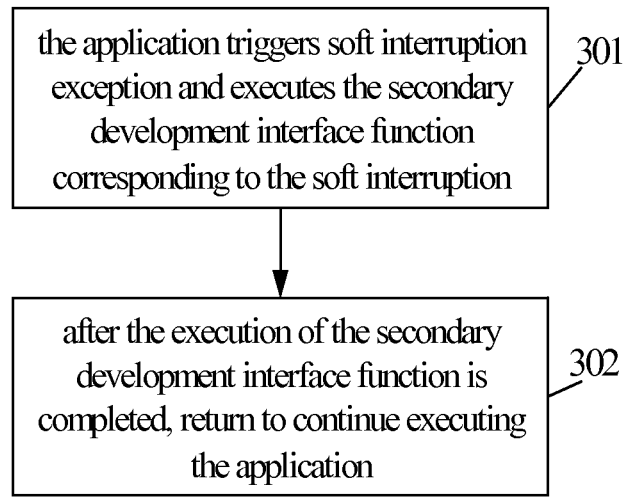
FIG. 3 is a schematic diagram of a method for accessing a secondary development interface according to one embodiment of the present disclosure.

If the application has to complete service functions such as short message, voice, data transmission and customized communication protocol stack and so on or the access and use of the mirror system resources during execution, then it has to access the secondary development interface of the M2M terminal module, and the particular process is as shown in FIG. 3 and includes the following steps.

Step 301, the application triggers soft interruption exception and executes the secondary development interface function corresponding to the soft interruption.

Herein, during execution, the application executes a soft interruption instruction, triggers soft interruption exception, and enters a soft interruption service program, and the soft interruption service program executes the secondary development interface function corresponding to the soft interruption according to the correlation stored locally between the soft interruption and the secondary development interface function. When the soft interruption instruction is application compiled, the soft interruption number corresponding to the secondary development interface function is also stated while stating the secondary development interface function in the head file of the application, and a soft interruption instruction is formed after compile. The secondary development interface function is a function corresponding to services such as short message, voice and so on, and the execution of the secondary development interface function is the execution process of a service.

Step 302, after the execution of the secondary development interface function is completed, return to continue executing the application.

Figure 4:
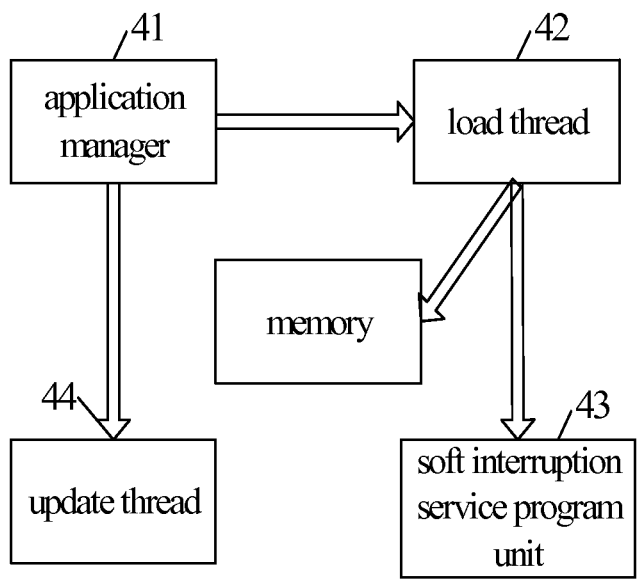
FIG. 4 is a schematic diagram of a device for loading an application according to one embodiment of the present disclosure.

Based on the above method, the present disclosure also provides an application loading device, and as shown in FIG. 4, the device includes an application manager 41 and a load thread 42, wherein the application manager 41 is used for receiving a load application instruction, creating a load thread, and ending the load thread 42 after the execution of an application is completed;

wherein the load application instruction contains the path of an application mirror file in a file system; and the load thread 42 is used for loading the application according to the load application instruction.

The load thread 42 is in particular used for opening an application mirror file in a file system according to an application mirror file path contained in the load application instruction, reading the length of the application mirror file, preloading the application mirror file, acquiring application mirror file information, and loading the application.

The load thread 42 is in particular used for allocating a space with the corresponding length in the memory according to a preset replacement function code length, reading the code of the replacement function in the most beginning part of the application mirror file, copying the code into the allocated space for execution, and receiving the application mirror file information returned by the replacement function.

The load thread 42 is in particular used for acquiring the space size required to execute the application mirror file according to the information of the application mirror file and the length of the application mirror file, releasing the space allocated by the preloading, allocating a space with corresponding size in the memory according to the space size required to execute the application mirror file, copying the application mirror file into the allocated space, executing the replacement function, sends an invoke application ingress function parameter to the replacement function for the replacement function to invoke the application ingress function.

The device further includes a soft interruption service program unit 43 for executing a secondary development interface function corresponding to a soft interruption instruction according to the soft interruption instruction and the correlation between the locally stored soft interruption instruction and the secondary development interface function; and correspondingly, the load thread 42 is further used for executing the soft interruption instruction, triggering soft interruption exception, and notifying the soft interruption service program unit 43 when executing the application, wherein the notification contains the soft interruption instruction.

The device further includes an update thread 44 for acquiring the updated application mirror file according to the update application mirror file address in the update application instruction to overwrite the application mirror file in the file system; and correspondingly, the application manager 41 further for receiving the update application instruction and creating an update thread, wherein the update application instruction includes the updated application mirror file address.

What is described above is merely preferred embodiments of the present disclosure, and not intended to limit the scope of protection of the present disclosure.

What is claimed is:

1. A method for loading an application, comprising:
    starting up, by a machine to machine (M2M) terminal module, an application manager after being powered up and initialized;
    receiving, by the application manager, a load application instruction and creating a load thread; and
    loading, by the load thread, the application according to the load application instruction and ending the load thread after execution of the application is completed;
    wherein after loading the application and before the execution of the application is completed, the method further comprises:
    when executing the application, triggering a soft interruption exception until a soft interruption instruction is executed and entering a soft interruption server program,
    wherein the soft interruption server program executes a secondary development interface function corresponding to the soft interruption instruction according to the soft interruption instruction and a locally stored correlation between the soft interruption instruction and the secondary development interface function,
    wherein the correlation of the soft interruption instruction and the secondary development interface function is based upon a soft interruption number corresponding to the secondary development interface function stated in a head file of the application; and
    returning to continue executing the application after the execution of the secondary development interface function is completed, wherein the secondary development interface function comprises functions corresponding to services comprising at least one of short message, voice, data transmission and customized communication protocol stack: or the secondary development interface function comprises functions corresponding to access and use of mirror system resources during execution of the application.

2. The method according to claim 1, wherein the load thread loading the application according to the load application instruction comprises:
    the load thread opening an application mirror file in a file system according to a path of the application mirror file contained in the load application instruction, reading a length of the application mirror file, preloading the application mirror file, acquiring information of the application mirror file, and loading the application.

3. The method according to claim 2, wherein preloading the application mirror file comprises:
    the load thread allocating, according to a preset replacement function code length, a space with the preset replacement function code length in a memory, reading a code of the replacement function, the length of which is a predetermined value and which is located at the most beginning of data content of the application mirror file, and copying the code into the allocated space for execution, the load thread sending a parameter for acquiring the information of the application mirror file to the replacement function, and the replacement function acquiring the information of the application mirror file according to the received parameter.

4. The method according to claim 2, wherein loading the application comprises:
    acquiring a space size required to execute the application mirror file according to the information of the application mirror file and the length of the application mirror file, releasing the space allocated by the preloading, allocating a space with the corresponding size in the memory and initializing according to the space size required to execute the application mirror file, copying the application mirror file into the allocated space, executing the replacement function, sending a parameter for invoking an application ingress function to the replacement function, the replacement function invoking the application ingress function.

5. The method according to 2, wherein after starting up the application manager, the method further comprises:
the application manager receiving an update application instruction, creating an update thread, wherein the update thread acquires an updated application mirror file according to an address of the updated application mirror file in the received update application instruction and overwriting the application mirror file in a file system.

6. The method according to claim 2, wherein the application mirror file is a mirror file generated by the application independently compiled by a compiler, addresses of data and instruction in the application mirror file are relative addresses, and the application mirror file is able to be copied into any segment of space in a memory for execution.

7. The method according to claim 2, wherein the information of the application mirror file is zero initialization data area length, wherein acquiring the information of the application mirror file comprises: the replacement function querying the application mirror file according to zero initialization data area length parameter of the replacement function to acquire a parameter value of a parameter corresponding to zero initialization data area length parameter of the replacement function, wherein the zero initialization data area length is a parameter and a corresponding parameter value stored in a form of global variables, which is generated when a compiler compiles the application to generate the application mirror file;
a space size required to execute the application mirror file is acquired by adding the length of the application mirror file with the zero initialization data area length.

8. The method according to claim 3, wherein loading the application comprises:
acquiring the space size required to execute the application mirror file according to the information of the application mirror file and the length of the application mirror file, releasing the space allocated by the preloading, allocating a space with the corresponding size in the memory and initializing according to the space size required to execute the application mirror file, copying the application mirror file into the allocated space, executing the replacement function, sending a parameter for invoking an application ingress function to the replacement function, the replacement function invoking the application ingress function.

9. The method according to claim 3, wherein after starting up the application manager, the method further comprises:
the application manager receiving an update application instruction, creating an update thread, wherein the update thread acquires an updated application mirror file according to an address of the updated application mirror file in the received update application instruction and overwriting the application mirror file in a file system.

10. The method according to claim 3, wherein the parameter for acquiring the information of the application mirror file or the parameter for invoking the application ingress function is a two dimensional array, wherein one dimension represents that various functions to be realized by the replacement function and one dimension represents the return value of the replacement function.

11. The method according to claim 4, wherein after the execution of the application is completed, the method further comprises:
the application ingress function returning a state value to the application manager according to the execution state; the load thread unloading the application mirror file and releasing the allocated space, and the application manager determining subsequent execution steps according to the received state value and a correlation stored thereby between the state value and the state.

12. The method according to claim 4, wherein the parameter for acquiring the information of the application mirror file or the parameter for invoking the application ingress function is a two dimensional array, wherein one dimension represents that various functions to be realized by the replacement function and one dimension represents the return value of the replacement function.

13. The method according to claim 1, wherein after starting up the application manager, the method further comprises:
the application manager receiving an update application instruction, creating an update thread, wherein the update thread acquires an updated application mirror file according to an address of the updated application mirror file in the received update application instruction and overwriting the application mirror file in a file system.

14. A device for loading an application, comprising:
an application manager and a load thread, wherein the application manager is configured to receive a load application instruction after a machine to machine (M2M) terminal module is powered up and started up, creates the load thread, and ends the load thread after execution of the application is completed; and
the load thread is configured to load and execute the application according to the load application instruction, ending the load thread after execution of the application is completed and notifying a soft interruption service program unit until the soft interruption instruction is executed;
wherein after loading the application and before the execution of the application is completed, the device further comprising:
the soft interruption service program unit, configured to execute a secondary development interface function corresponding to a soft interruption instruction according to the soft interruption instruction and a correlation between the soft interruption instruction and the secondary development interface function,
wherein the correlation of the soft interruption instruction and the secondary development interface function is based upon a soft interruption number corresponding to the secondary development interface function stated in a head file of the application; and
returning to continue executing the application after the execution of the secondary development interface function is completed,
wherein the secondary development interface function comprises functions corresponding to services comprising at least one of short message and voice, data transmission and customized communication protocol stack: or the secondary development interface function comprises functions corresponding to access and use of mirror system resources during execution of the application.

15. The device according to claim 14, wherein
the load thread is configured to, open an application mirror file in a file system according to a path of the application mirror file in the load application instruction, read a length of the application mirror file, preload the application mirror file, acquire information of the application mirror file, and load the application.

16. The device according to claim 15, wherein the load thread is configured to allocate, according to a preset replacement function code length, a space with the preset replacement function code length in a memory, read a code of the replacement function, the length of which is a predetermined value and which is located at the most beginning of data content of the application mirror file, copy the code into the allocated space for execution, and receive the information of the application mirror file returned by the replacement function.

17. The device according to claim 15, wherein the load thread is configured to, acquire a space size required to execute the application mirror file according to the information of the application mirror file and the length of the application mirror file, allocate a space of corresponding size in the memory, copy the application mirror file into the allocated space, and execute the replacement function, and the replacement function invokes an ingress function to execute the application.

18. The device according to 16, wherein the load thread is configured to, acquire the space size required to execute the application mirror file according to the information of the application mirror file and the length of the application mirror file, allocate a space of corresponding size in the memory, copy the application mirror file into the allocated space, and execute the replacement function, and the replacement function invokes an ingress function to execute the application.

19. The device according to claim 14, further comprising: an update thread configured to, acquire an updated application mirror file according to an address of the update application mirror file in an update application instruction, overwrite the application mirror file in the file system; and correspondingly, wherein the application manager is further configured to receive the update application instruction and creates the update thread.

\* \* \* \* \*